INVENTOR.
HARVEY ROSENBERG
BY
William E. Cleaver
AGENT

June 5, 1962 H. ROSENBERG 3,038,088

TRANSISTOR SWITCH HAVING COMPENSATING MEANS FOR THERMAL EFFECTS AND TRANSIENT PULSES

Filed March 13, 1959 3 Sheets-Sheet 2

INVENTOR.
HARVEY ROSENBERG

BY William E. Cleaver

AGENT

*INVENTOR.*
HARVEY ROSENBERG
*BY* William E. Cleaver
AGENT

United States Patent Office 3,038,088
Patented June 5, 1962

3,038,088

TRANSISTOR SWITCH HAVING COMPENSATING MEANS FOR THERMAL EFFECTS AND TRANSIENT PULSES

Harvey Rosenberg, Drexel Hill, Pa., assignor to Burroughs Corporation, Detroit, Mich., a corporation of Michigan Filed Mar. 13, 1959, Ser. No. 799,237
5 Claims. (Cl. 307—88.5)

This invention relates to electronic switches, and in particular to solid state electronic switches.

It is well known that a single transistor can be effectively used as an electronic switching device. Usually when a transistor is referred to as a switch, it is considered that the transistor is connected to certain reference voltage sources and further connected to receive a pulse or control signal at its base. In response the pulse, or control signal, is amplified and inverted to appear as an output at the collector of the transistor. Other connection configurations using the emitter as the output element, etc., of course, are possible. In data processing systems, however, it is desirable very often to use the transistor as a "toggle" switch. In other words, the signal to be passed through the switch, which signal might be in some oscillating form, is applied to the emitter element. When the base is properly conditioned, the signal applied to the emitter is transmitted to the collector to provide an output signal substantially resembling the input signal. It is to be understood that the switch can be operative with the collector as the input element, etc. This operation is analogous to a mechanical toggle switch wherein the signal to be transmitted is fed to condition one terminal, and when the transfer strip, or toggle element, is flipped to the conditioned terminal, the signal passes through the switch.

Single transistors used as this last described "toggle" switch, have normally heretofore been arranged in a circuit as shown in FIG. 1*a*. The use of a single transistor as a "toggle" switch is sometimes inadequate, however, particularly in data processing operations where both the A.-C. and D.-C. voltage drops across the closed switch are of prime importance. The inadequacy of a single transistor switch is that input signals can be of such polarity and can reach sufficient amplitude to tend to forward bias the cut-off junction and subsequently cause a "cut-off" switch to partially conduct. For example, if a signal which is to be passed through the switch is applied to the input electrode, or emitter, of a common base PNP transistor switch and this input signal becomes more positive than the reverse bias voltage on the collector base junction (see FIG. 1*a*), then the "Off" state switch impedance is only $R_b$ plus the forward bias of the E-B junction. Secondly, a single transistor arrangement provides large "Off" state currents, the main portion of which can be considered thermal currents, and thirdly, the single transistor provides a relatively large "On" state voltage drop across the transistor. The requisites for a high quality, low level, D.-C. coupled switching circuit are small "Off" state currents and small "On" state input terminal to output terminal voltage drops. Such requisites clearly make the single transistor, just described, somewhat inadequate.

With such limitations being known there has been introduced into the transistor switching art a switching network called a series-pair switch shown in FIG. 16. In its normal arrangement the series-pair switch has two junction transistors with their respective collector elements connected in common, and their respective base elements connected through their respective base resistors. The respective emitter elements of the pair of transistors, connected as just described, serve as the input and output terminals of the switch. The series-pair switch is turned "On" by biasing means connected between the common connection of the collectors and the junction of the base resistors.

When the series-pair switch has been turned "On," this arrangement provides the advantage of having the collector-emitter voltages developed respectively across each transistor in opposition to each other and substantially equal. Therefore, for a signal applied to the input terminal of the switch there is effected a substantially short circuit condition between the input and output terminals, or the respective emitter elements, of the series connected transistors. This network, for the most part, overcomes the three undesirable aspects of the single transistor "toggle" switch described above. First, if any input signal forward biases one of the transistors in the pair, it will simultaneously back-bias the other transistor, thereby mitigating the effects of a spurious "On" condition. Secondly, the effective short circuit condition, or cancellation of the inherent collector-emitter voltage drops, provides that a low level signal applied to the input will appear in substantially its low level form at the output. In addition, thermal leakage currents which plague transistor switching networks in general, tend to cancel one another with respect to the load resistor.

While the series-pair switch operates satisfactorily at ambient room temperatures, there are two undesirable characteristics which have been observed. At relatively high temperatures, for instance above 120° F., during periods of time when the switch is "Off," the output terminal voltage signal will vary due to unbalanced thermal currents in the load. Obviously this last mentioned condition is regarded as undesirable if the switch is to be used in equipment where the ambient temperatures fluctuate over a large range, including high temperatures. It has also been observed that the switch, which in normal operation is pulsed "On" through some form of A.-C. coupling, such as a pulse transformer, has an unsatisfactory output signal waveform. The waveform has been found to include a voltage transient when the sampling pulse is terminated, or when the switch is turned "Off."

It follows then that a circuit arrangement which improves the operative temperature range of the series-pair switch, and which provides an improved series-pair switch output signal (e.g., without the voltage transient after the switch has been turned "Off"), would be desirable.

It is therefore an object of the present invention to provide an improved solid state electronic switch.

It is a further object of the present invention to provide a transistor series-pair switch which can operate satisfactorily over a large ambient temperature range.

It is a further object of the present invention to provide a transistor series-pair switch which provides an output signal whose waveform does not include substantial voltage transients in response to a pulse sampling signal.

In accordance with a main feature of the present invention there is provided for a series-pair switch, a D.C. voltage floating with respect to ground connected across the collector common connection and the junction of the base resistors. This provides a back-bias on the respective collector junctions to greatly reduce thermal currents flowing through the load.

In accordance with another main feature of the present invention, the $\beta$ ratio of the transistors of the series-pair (the ratio being for the switch input transistor to the switch output transistor) is chosen to be in the range of 1:1 to 1:2.

In accordance with a further main feature of the present invention there is provided a capacitor connected across the emitter-collector electrodes of the switch output transistor to provide means for cancellation of the output waveform switching transients.

The foregoing and other objects and features of this invention will be best understood by reference to the following description of embodiments of the invention taken in conjunction with the accompanying drawings wherein:

FIG. 1*a* is a schematic of a (prior art) single transistor "toggle" switch;

FIG. 1*b* is a schematic of a (prior art) pulsed "On" series-pair switch;

FIG. 2*a* is a schematic of the D.-C. representation of the series-pair circuit of FIG. 1*b* without means for turning the switch "On";

FIG. 2*b* shows graphically the relationship between thermal current output and ambient temperature for the circuit of FIG. 2*a*;

FIG. 3*a* shows the circuitry of FIG. 2*a* wherein a voltage source has been added to compensate for thermal effects;

FIG. 3*b* shows graphically the relationship between the thermal current output and ambient temperatures for the circuit of 3*a*;

Figure 1B:
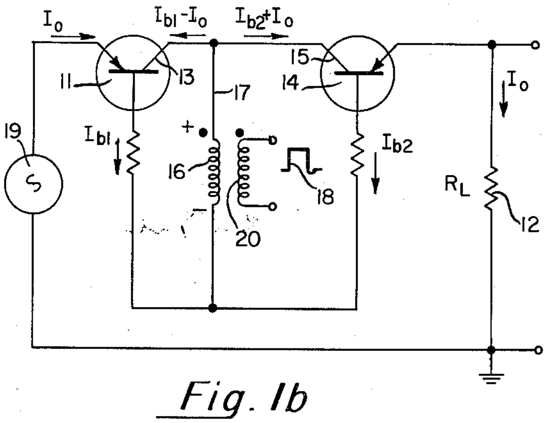

Briefly referring to FIG. 1*b*, an understanding of the configuration of the currents as found in the prior art series-pair switch can be obtained. If it is considered that an input current $I_0$ is supplied to the emitter of the transistor 11, then the same current $I_0$ must pass through the load resistor 12. Consider that current flowing to the two collector elements 13 and 15 is supplied from the secondary winding 16 in response to the sampling pulse 18 applied to the primary 20. Base current which can be called $I_{b_1}$ and $I_{b_2}$ will flow in the directions shown in FIG. 1. The summation of the currents into the transistor 11 equals 0; hence, the current flowing in the collector 13 of transistor 11 must be $I_{b_1}$ minus $I_0$, and must be flowing in the direction shown. The current summation into transistor 14 also equals 0; hence, the current flow into the collector 15 of the transistor 14 must be $I_{b_2}$ plus $I_0$ in the direction shown. If these two collector currents are added, the $I_0$ terms are dropped out and it becomes evident that the current supplied on the path 17 is $I_{b_1}$ plus $I_{b_2}$.

Figure 1A:
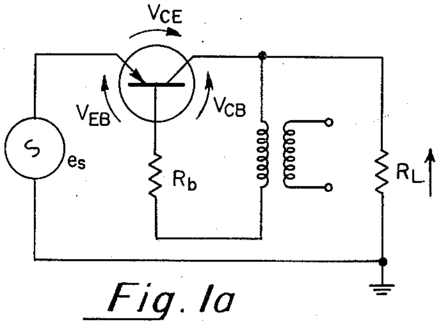

In the series-pair switch there is effected a cancellation of the voltages developed internally in the transistors when the transistors are bottomed for the operation of the switch. Such cancellation effect does not consider the signal voltage applied for transmission through the switch, or the voltage drops developed in response to this last mentioned applied signal. When the transistor in FIG. 1*a* is bottomed, the voltage drop across the transistor, $V_{ce}$, without consideration of the voltage drops attributable to the applied signal to be passed through the switch, are expected to approximate 50 millivolts. Therefore a signal passing through the switch of FIG. 1*a* operates with a 50 millivolt D.-C. level, and if the signal passing through is, in itself, in the order of a few millivolts, the output signal would be varied from the applied input signal by an intolerable amount. In the series-pair switch, this 50 millivolt drop appears across both transistors 11 and 14, but in opposing polarity, so that there is a cancellation of this internally developed voltage. When the transistors 11 and 14 are bottomed, there is presented approximately a 20 to 30 ohm resistance to an applied signal of a few millivolts, so that the voltage drop due to the applied signal is negligible when the load is considered in the order of 5K. In effect, when the switch has been pulsed "On," the transistors, or the series-pair switch network can be reduced in an equivalent circuit concept, to a pair of resistors when analyzed for its relationship to the applied signal. The explanation of such an equivalent circuit is found in the textbook "Junction Transistor Electronics," by Richard B. Hurley, published by Wiley, 1958. Therefore, a low level input signal will pass through the switch with little distortion. The value of the low level signal passing through the switch will be independent of the value of the sampling signal.

It also becomes evident from a study of FIG. 1*b* that if the switch is not pulsed "On" by a pulse, such as 18, that a positive signal from the input source 19 would find a large impedance across the base-emitter junction of transistor 14, while a negative signal at the input 19 would find a large impedance across the base-emitter junction of transistor 11. This prevents either a positive or negative signal from passing through the switch. The normal operation of the series-pair switch, as just briefly described, provides the advantages mentioned earlier when such a switching network is compared to a single junction transistor used as a "toggle" switch.

Figure 2A:
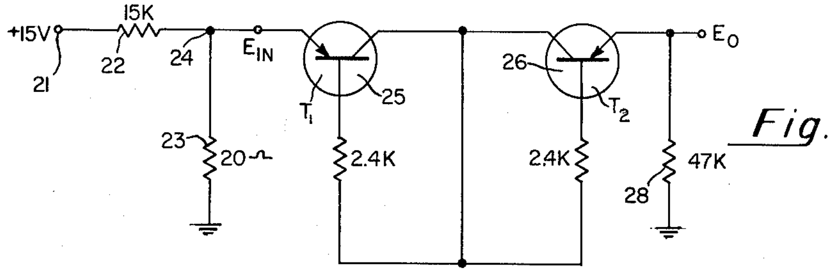

Referring in particular to FIG. 2*a*, there is shown circuitry similar to a series-pair switch omitting the pulse transformer of FIG. 1. The curves of FIG. 2*b* were obtained from tests conducted on the circuit shown in FIG. 2*a*. In these tests, a D.-C. voltage of 15 volts, as shown, is applied to the terminal 21. By providing a 15K resistor 22 in series with a 20 ohm resistor 23, there is provided a 20 mv. input at point 24. The 20 mv. input supplied at point 24 represents an input signal to the switch and it is to be understood that in practice the input signal may vary in amplitude and sign. For the purposes of the test, the circuit of FIG. 2*a* includes a 47K load resistor 28 to accentuate the thermal current output by developing relatively high voltages across the load. In actual practice, the load of the circuit, considering the other component values, would be in the neighborhood of less than 5K. The two transistors 25 and 26 used for the tests were Philco SB100 transistors. Tests were made with other transistors, however, such as Philco 2*n*393's and the resultant curves were similar to the curves for the SB100's shown in this application. The switch shown in FIG. 2*a* does not provide means to turn the switch "On." Normally a pulse transformer, as in FIG. 1*b*, is included. It should also be understood that the switch could be arranged with the emitter elements common connected and the input and output signals applied to and taken from the two collector terminals. It can be shown, however, that this last mentioned arrangement is less desirable with respect to thermal currents and series voltage drop across the switch in the "On" state.

It will be considered in this discussion that 77° F. by definition is room temperature. It will be noted from the curves of FIG. 2*b* that as the ambient temperature increases from 80° F. to 150° F., the output signal increases from an approximate value of 8 mv. to an approximate value of 19 mv. In other words, the 19 mv. voltage at the output terminal of the switch at 150° F. appeared to be virtually following the 20 mv. input signal even though the switch was not turned "On." Such a condition is obviously intolerable if the switch is to be used at low signal levels over a large temperature range up to and including 150° F.

Figure 3A:
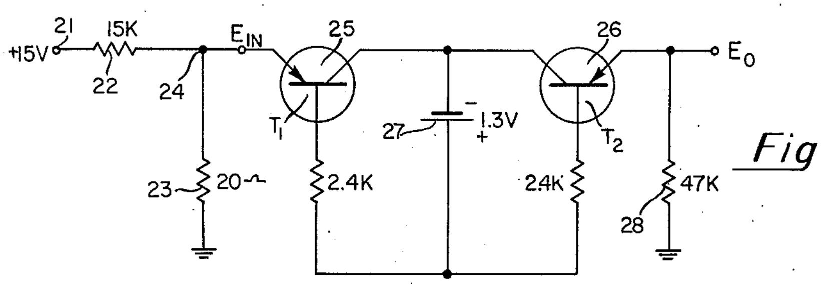
Figure 3B:
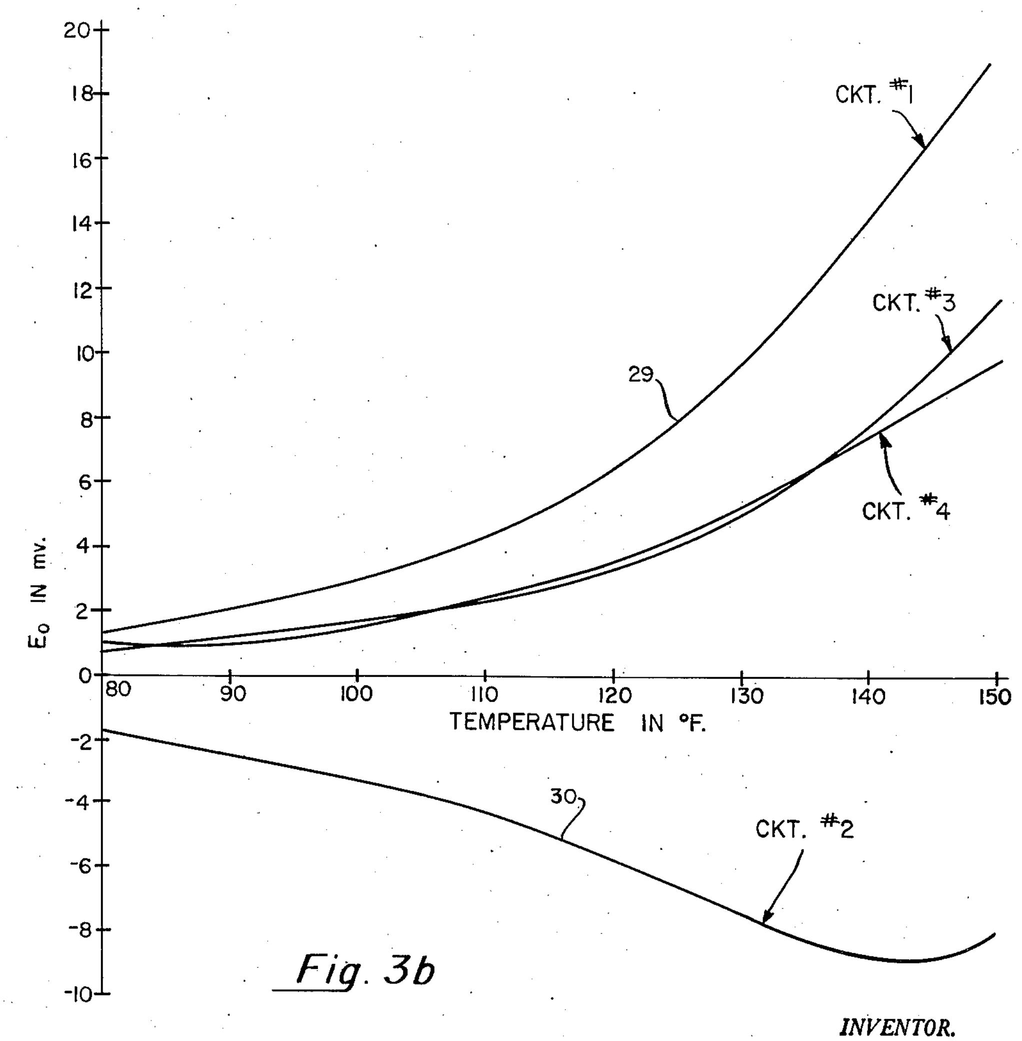

In accordance with the present invention, a D.-C. bias in the form of the battery 27 is added to the circuit, as shown in FIG. 3*a*, and much better results were obtained as evidenced by the curves of FIG. 3*b*. The addition of the battery 27 to the circuit, connected with the polarity shown, effects a back-bias of the collector-base junctions of both transistors 25 and 26. Such back-biasing reduces the thermal currents passing through the respective transistors 25 and 26 and consequently through the switch.

Figure 2B:
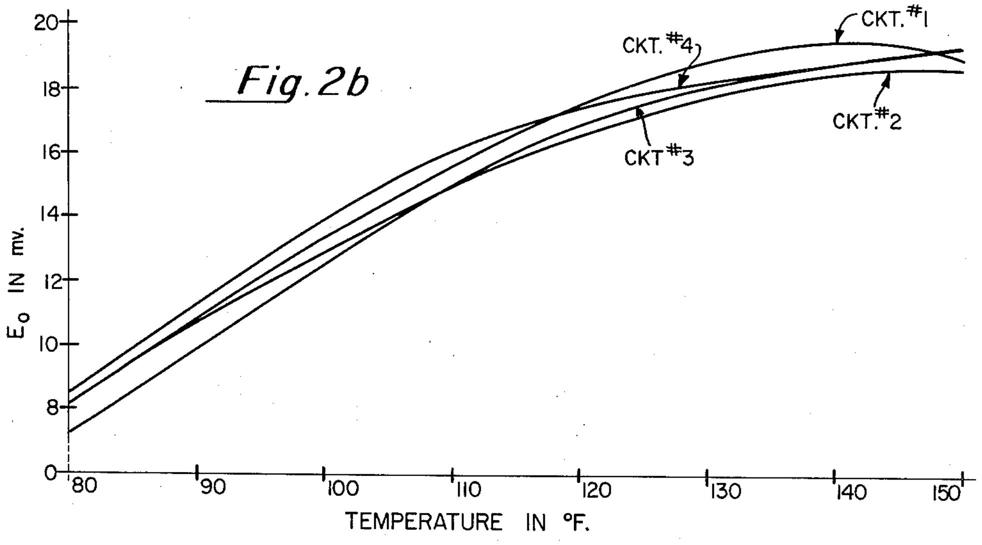
Figure 4:
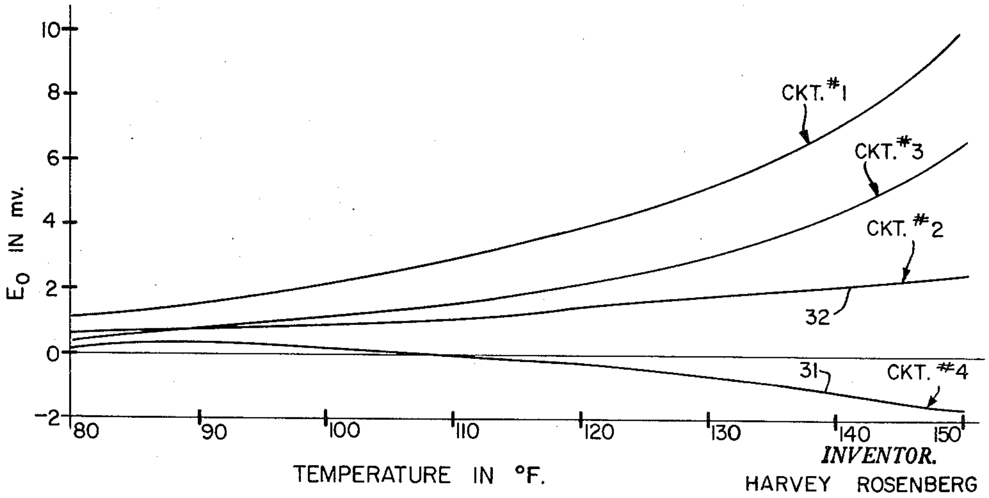
FIG. 4 shows graphically the relationship between thermal current output and ambient temperatures for the circuit of 3*a* when $\beta$ ratios are predetermined.

The curves of FIG. 3*b* reveal that for circuits 3 and 4 (circuits 1, 2, 3 and 4 are defined below) the output at 100° F. is substantially the same as at room temperature, and at 150° F. the output is approximately only 50% of the 20 mv. input, as compared to the circuit of FIG. 2*b* (circuits 3 and 4) where approximately 100% of the input appeared at the output. The curve 29, FIG. 3*b*, of circuit No. 1 shows a decided improvement when compared with the curves of FIG. 2*b* up to 130° F., but at 150° F. the curve 29 shows the circuit has an output which approximates 100% of the input, behaving, thereby, similarly to the non-biased circuit of FIG. 2*a*. The curve 30, FIG. 3*b*, for circuit No. 2, on the other hand, shows a negative output with an increase in ambient temperature. The circuits 1 through 4 are identified in that the transistors $T_1$ and $T_2$ are selected so that they have the respective $\beta$ magnitudes and $\beta$ ratios shown in Tables I and II, where $\beta$ the current amplification factor for the grounded emitter configuration is defined as the ratio $$\frac{\Delta I_c}{\Delta I_b}$$

where $\Delta I_c$ is the incremental change in collector current produced by the incremental change in base current $\Delta I_b$. The graphical relationship of thermal output voltage vs. ambient temperature for the circuit of FIG. 2*a* is shown in FIG. 2*b*, the transistors $T_1$, $T_2$ having the $\beta$ values shown in Table I below. The relationship between thermal output voltage and ambient temperature for the circuit of FIG. 3*a* is shown in FIG. 3*b*, the transistors $T_1$, $T_2$ having the $\beta$ values shown also in Table I. Finally, the thermal output voltage vs. ambient temperatures for the circuit of FIG. 3*a* (when the transistors $T_1$, $T_2$ have $\beta$ values shown in Table II) is shown in FIG. 4.

*Table I (FIGS. 2a and 3a)*

| Circuit | Transistor | $\beta$ | $\beta$ Ratio |
|---|---|---|---|
| 1 | $T_1$ | 54 | 2.08/1 |
| | $T_2$ | 26 | |
| 2 | $T_1$ | 24 | 1/2.08 |
| | $T_2$ | 50 | |
| 3 | $T_1$ | 32 | 1/1 |
| | $T_2$ | 32 | |
| 4 | $T_1$ | 40 | 1/1 |
| | $T_2$ | 40 | |

*Table II (FIG. 3a)*

| Circuit | Transistor | $\beta$ | $\beta$ Ratio |
|---|---|---|---|
| 1 | $T_1$ | 40 | 1/1 |
| | $T_2$ | 40 | |
| 2 | $T_1$ | 28 | 1/1.53 |
| | $T_2$ | 43 | |
| 3 | $T_1$ | 27 | 1/1.67 |
| | $T_2$ | 45 | |
| 4 | $T_1$ | 24 | 1/2.08 |
| | $T_2$ | 50 | |

It is of interest to note the following from Table I: that the $\beta$ ratio of circuit No. 1 is approximately 2.1:1, with $T_1$ having the higher $\beta$ value; that the $\beta$ ratio of circuit No. 2 is approximately 1:2.1 with $T_2$ having the higher $\beta$; while circuits 3 and 4 have $\beta$ ratios of 1:1 with circuit No. 4 having a higher $\beta$ value.

These observations suggest that it can be predicted that if the $\beta$ ratios are properly chosen an improved series-pair switch, compensated for thermal effects, will result.

Examining FIG. 4 and the circuit values from Table II it is observed that the above circuit design prediction is substantiated by the provision of a series-pair switch having more desirable operating characteristics. It is seen in FIG. 4 that circuit No. 1 having a $\beta$ ratio of 1:1 shows a thermal current performance similar to circuit No. 4 of FIG. 2*b* which would be expected. It is further seen in FIG. 4 that circuit No. 4 having a $\beta$ ratio of 2.1:1 shows substantially little difference in thermal current output between room temperature and 150° F. indicating a highly desirable arrangement. Examining the curves of the four circuits and the designated $\beta$ ratios of the circuit of FIG. 4 shown in Table I, leads to the conclusion that a $\beta$ ratio of 2.1:1 ($T_2$ to $T_1$) should provide a series-pair switch which has highly desirable operational characteristics for compensating thermal effects.

While the curve 31 for circuit No. 4 of FIG. 4 leads to the conclusion that this circuit possesses the optimum $\beta$ arrangement, such a conclusion is too narrow and not entirely correct. It has been found that if a dozen or more pairs of transistors whose respective manufacturer's ratings provide $\beta$ ratios of 2.1:1 (for $T_2$:$T_1$) were tested in the circuit of FIG. 3*a*, there would be obtained a cone-shaped family of curves lying in the general area of curve 31 of FIG. 4. The cone-shaped family of curves would overlap into another family of curves which in like manner would be obtained for a dozen or more pairs of transistors whose respective manufacturer's $\beta$ ratio was 1.5:1, as depicted by curve 32, FIG. 4. Such variations exist because the manufacturer's $\beta$ value for a transistor is measured at a fixed temperature and it is known that $\beta$ values, $I_{co}$ values, $I_{eo}$ values, etc. of transistors do not vary uniformly with temperature for any two transistors. Therefore, while the curves of FIG. 4 may indicate that a $\beta$ ratio of 2.1:1 is optimum, a more useful and general conclusion can be drawn, such conclusion being that a $\beta$ ratio in the range of 1:1 to 2:1, with the transistor at the output terminal end having the higher $\beta$ value, is a desirable design consideration.

Figure 6:
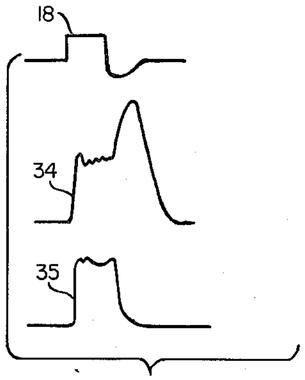
FIG. 6 shows the relationship between the sampling pulse, and an improved and a non-improved output signal waveform.
Figure 5:
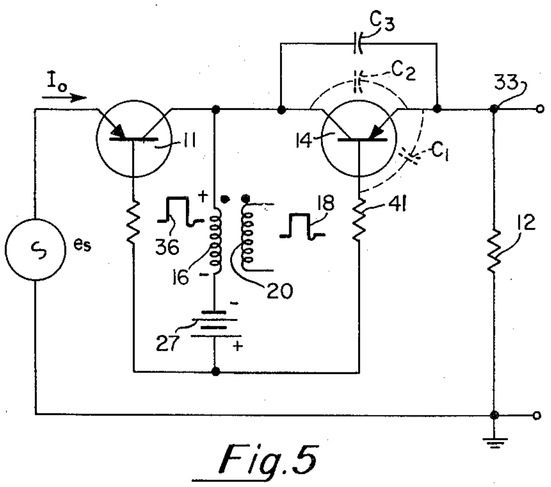
FIG. 5 shows schematically an embodiment of the inventive series-pair switch with a capacitor added for improved output signal waveshape.

It has been found that when the inventive circuit of FIG. 5, without the capacitor $C_3$ added, is pulsed "On" by a pulse 18 applied to primary 20, the output pulse at point 33 contains a voltage transient commencing at the trailing edge of pulse 18. This is shown graphically in FIG. 6. The pulse 18 of FIG. 6 is the sampling pulse as shown in FIG. 5. Output pulse 34, of FIG. 6, is the output pulse at point 33 when the circuit of FIG. 5 does not have the capacitor $C_3$ added. Output pulse 35, FIG. 6, is the output pulse at point 33 when the circuit of FIG. 5 has the capacitor C added, connected as shown between the collector and emitter of transistor 14. It is to be understood that there has been no attempt to show a meaningful or proper amplitude relationship between waveform 18 and waveforms 34 and 35, the output signal amplitude (pulses 34 and 35) being independent of the sampling pulse amplitude. The transient portion, however, is dependent on the trailing portion of the sampling pulse. FIG. 6 is shown to depict the time relationship between the sampling pulse and the output pulse.

Figure 7:
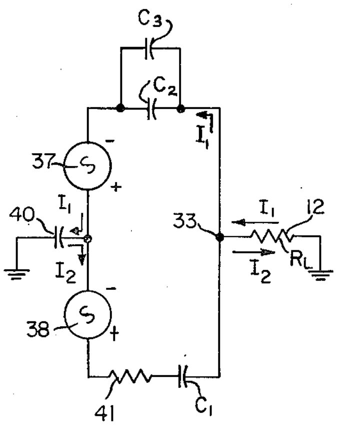
FIG. 7 shows a theoretical equivalent circuit for a portion of FIG. 5.

An analysis of the circuit of FIG. 5, by way of explanation of the improved output signal waveform 35, can be made by considering FIG. 7. FIG. 7 represents an equivalent circuit for the right hand portion of the circuit of FIG. 5. When the pulse 18 of FIG. 5 terminates, there is an induced voltage swing in the negative direction due to the collapsing field of the transformer primary, as shown by the pulse 36 in FIG. 5. The voltage thus developed across the secondary can be replaced for analysis by two generators 37 and 38 of FIG. 7. The distributed capacitance of secondary winding 16 is represented in FIG. 7 as a lumped capacitor 40 connected to ground at the center of the secondary winding. The resistors 41 and 12 in FIG. 5 are identical to resistors 41 and 12 in FIG. 7. The capacitors $C_1$ and $C_2$ in FIG. 5 represent the inherent base-to-emitter and collector-to-emitter capacitances, respectively, of transistor 14. The capacitor $C_3$, which is an added physical capacitor in the circuit of FIG. 5, is shown shunting capacitor $C_2$ in FIG. 7. It can be seen from a study of FIG. 7 that if the current $I_1$ from the generator 37 equals the current $I_2$ from generator 38, the IR drops across the resistor 12 from these two currents will be equal and opposing so that the voltage output signal experienced at point 33 would be negligible. Prior to the addition of the capacitor $C_3$, the current $I_2$ was greater since the inherent base-to-emitter capacitance $C_1$ is much greater than the inherent collector-to-emitter capacitance. This current unbalance causes the positive trailing edge voltage transient depicted in FIG. 6 by waveform 34. The addition of $C_3$ enables $I_1$ to equal $I_2$, which is equivalent to balancing a bridge, which in turn greatly reduces the output transient as shown by waveform 35, FIG. 6.

In view of the above discussion it becomes clear that with the capacitor $C_3$ added, with the battery 27 added, and the $\beta$ ratio of the transistors, $T_2$ to $T_1$, chosen so that output end transistor of the switch has the larger $\beta$ (the ratio range being from 1:1 to 2:1), there is provided an improved series-pair switch compensated for thermal effects and transient response.

While I have described above the principles of our invention in connection with specific apparatus, it is to be clearly understood that this description is made only by way of example and not as a limitation to the scope of my invention as set forth in the objects thereof and in the accompanying claims.

What I claim is:

1. A solid state electronic switch compensated for providing an output signal having negligible transient pulse characteristics comprising first and second transistors each respectively having collector, emitter and base elements, first circuitry means to couple to said emitter element of said first transistor a source of input signals to be passed through said switch, output means coupled to said emitter element of said second transistor, second circuitry means coupling in common connection said collector elements of said first and second transistors, third circuitry means coupling said base elements of said first and second transistors, control signal triggering means coupled between said second and third circuitry means to condition said transistors into a state of conduction and provide current flow through said transistors in response to said input signals and an applied control signal, and capacitance means coupled across said emitter element and said collector element of said second transistor to provide a discharge path thereacross thereby providing a preferred output signal waveshape.

2. A solid state electronic switch compensated for thermal and transient pulse effects comprising, first and second transistors each respectively having collector, emitter and base elements, first circuitry means to couple to said emitter element of said first transistor a source of input signals to be passed through said switch, output means coupled to said emitter element of said second transistor, second circuitry means coupling in common connection said collector elements of said first and second transistors, third circuitry means coupling in common connection said base elements of said first and second transistors, a voltage source coupled between second and third circuitry means to provide a back-bias across the respective collector-base junctions of said first and second transistors, a pulse transformer having its secondary winding connected between said second and third circuitry means to provide a control pulse thereacross to overcome said back-bias and provide current flow through said transistors in response to said input signal and said control signal, and capacitance means coupled across said emitter element and said collector element of said second transistor to provide a discharge thereacross thereby providing a preferred output signal waveshape.

3. A solid state electronic switch compensated for thermal and transient pulse effects according to claim 2 wherein said direct-current voltage source includes a battery having its negative terminal connected to said second circuitry means and its positive terminal connected to said third circuitry means and wherein the $\beta$ ratio relationship for said first transistor to said second transistor is in the range of 1:1 to 1:2 where $\beta$ the current amplification factor for the grounded emitter configuration is defined as the ratio $$\frac{\Delta I_c}{\Delta I_b}$$

$\Delta I_c$ being the incremental change in collector current produced by the incremental change in base current $I_b$.

4. A solid state electronic switch compensated for thermal effects comprising, first and second transistors each having collector, emitter and base elements respectively, the $\beta$ ratio of the second transistor to that of said first transistor being chosen in the range of 1:1 to 2:1 where $\beta$ the current amplification factor for the grounded emitter configuration is defined as the ratio $$\frac{\Delta I_c}{\Delta I_b}$$

$\Delta I_c$ being the incremental change in collector current produced by the incremental change in base current $\Delta I_b$, first circuitry means to couple said emitter element of said first transistor with a source of input signals to be passed through said switch, output means coupled to said emitter element of said second transistor, second circuitry means coupling in common connection said collector elements of said first and second transistors, third circuitry means coupling said base elements of said first and second transistors, a voltage source coupled between said second and third circuitry means to provide a back bias across the collector-base junctions of said first and second transistors respectively, and control signal triggering means coupled between said second and third circuitry means to provide a control signal thereacross to overcome said back bias and provide current flow through said transistors in response to the coincidence of said input signals and said control signal.

5. A solid state electronic switch compensated for thermal effects comprising, first and second transistors each having input, output and control elements respectively, the $\beta$ ratio of said first transistor to that of said second transistor being chosen in the range of 1:1 to 1:2, where $\beta$ the current amplification factor for the grounded emitter configuration is defined as the ratio $$\frac{\Delta I_c}{\Delta I_b}$$

$\Delta I_c$ being the incremental change in collector current produced by the incremental change in base current $\Delta I_b$, first circuitry means coupled to said input element of said first transistor with a source of input signals to be passed through said switch, output means coupled to said input element of said second transistor, second circuitry means coupling in common connection said output elements of said first and second transistors, third circuitry means coupling said control elements of said first and second transitors, a direct voltage source having its negative terminal coupled to said second circuitry means and its positive terminal connected to said third circuitry means to provide a back bias across the output-control junctions of said first and second transistors respectively, and a pulse transformer having its secondary winding connected between said second and third circuitry means to provide a control pulse thereacross to overcome said back bias and provide current flow through said transistors in response to the coincidence of said input signals and said control signal.

References Cited in the file of this patent

UNITED STATES PATENTS

| | | |
|---|---|---|
| 2,860,258 | Hall | Nov. 11, 1958 |
| 2,862,104 | Summers | Nov. 25, 1958 |
| 2,891,171 | Shockley | June 16, 1959 |
| 2,899,571 | Myers | Aug. 11, 1959 |

OTHER REFERENCES

Bright: "Junction Transistors Used as Switches," March 1955, pp. 111–121.

Hunter Publication, "Handbook of Semiconductor Electronics," October 15, 1956. McGraw-Hill Book Co., New York, pp. 16–25 to 16–29.

UNITED STATES PATENT OFFICE

CERTIFICATE OF CORRECTION

Patent No. 3,038,088 June 5, 1962

Harvey Rosenberg

It is hereby certified that error appears in the above numbered patent requiring correction and that the said Letters Patent should read as corrected below.

Column 1, line 66, for "16" read -- lb --; column 7, line 62, after "discharge" insert -- path --; line 66, strike out "direct-current"; column 8, line 2, for "$I_b$" read -- $\Delta I_b$ --.

Signed and sealed this 6th day of November 1962.

(SEAL)
Attest:

ERNEST W. SWIDER
Attesting Officer

DAVID L. LADD
Commissioner of Patents